United States Patent [19]
Takeyama et al.

[11] Patent Number: 5,884,612
[45] Date of Patent: Mar. 23, 1999

[54] GAS VENTILATION SYSTEM FOR INTERNAL COMBUSTION ENGINE

[75] Inventors: Masaki Takeyama, Nishio; Tohru Yoshinaga; Masahiro Takigawa, both of Okazaki; Taiyo Kawai, Aichi-ken; Akira Ii, Toyota, all of Japan

[73] Assignees: Nippon Soken, Inc., Nishio; Toyota Jidosha Kabushiki Kaisha, Toyota, both of Japan

[21] Appl. No.: 779,707

[22] Filed: Jan. 7, 1997

[30] Foreign Application Priority Data

May 22, 1996 [JP] Japan ..................................... 8-151781

[51] Int. Cl.⁶ .................................................. F01M 13/00
[52] U.S. Cl. ............................................ 123/572; 123/568
[58] Field of Search .................................... 123/568, 572, 123/573, 574

[56] References Cited

U.S. PATENT DOCUMENTS

| | | | |
|---|---|---|---|
| 2,128,154 | 8/1938 | Masters | 123/572 |
| 4,191,150 | 3/1980 | Siewert | 123/572 |
| 4,922,882 | 5/1990 | Topfer | 123/572 |
| 5,533,487 | 7/1996 | Cailey | 123/568 |
| 5,572,979 | 11/1996 | Czadzeck | 123/568 |

FOREIGN PATENT DOCUMENTS

| | | |
|---|---|---|
| 56-161166 | 5/1955 | Japan . |
| 2-119963 | 9/1990 | Japan . |
| 8-144732 | 6/1996 | Japan . |

*Primary Examiner*—Marguerite McMahon
*Attorney, Agent, or Firm*—Pillsbury Madison & Sutro, LLP

[57] ABSTRACT

A gas ventilation system for an internal combustion engine is provided which includes a downstream intake pipe communicating with cylinders of the engine, an upstream intake pipe communicating with the downstream intake pipe through a throttle valve, and a gas ventilation pipe for recirculating a given gas to the engine. The system also has an inner hollow cylinder connected to the upstream intake pipe, disposed within the downstream intake pipe to define a gas passage between the periphery of the inner cylinder and an inner wall of the downstream intake pipe. The gas passage communicates with the gas ventilation pipe and serves as an isolating member for isolating flow of the gas entering the downstream intake pipe through the gas ventilation pipe from swirls produced by intake air flowing downstream of the throttle valve from the upstream intake pipe.

24 Claims, 9 Drawing Sheets

GAS VENTILATION SYSTEM FOR INTERNAL COMBUSTION ENGINE

BACKGROUND OF THE INVENTION

1 Technical Field

The present invention relates generally to a gas ventilation system for internal combustion engines, and more particularly to an improvement on a gas ventilation system designed to keep free from oil contained in the blowby gas to a throttle valve of an engine.

2 Background of Related Art

Figure 1:
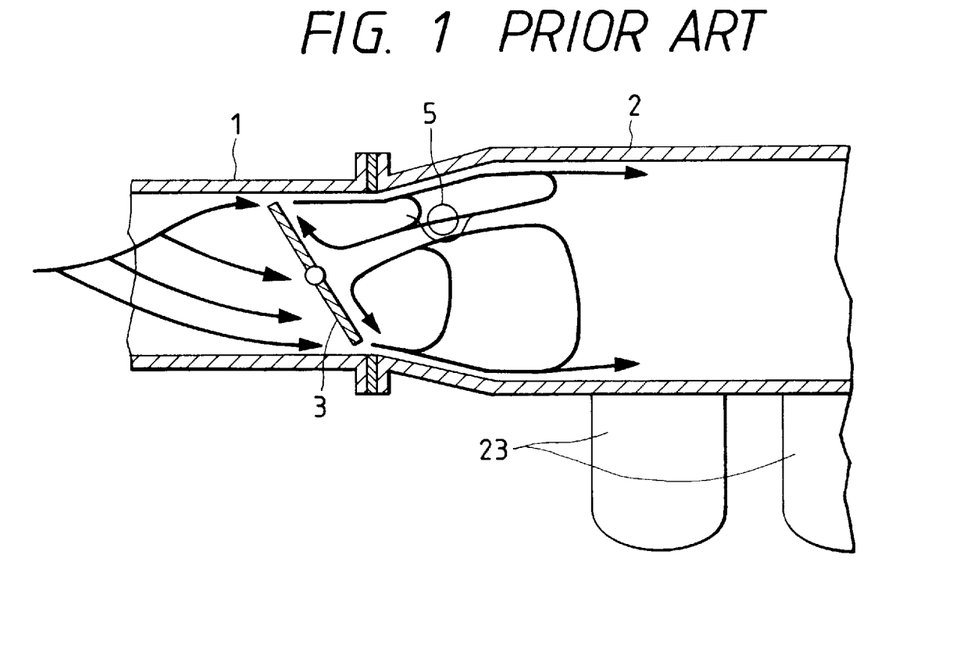
FIG. 1 is a vertical cross sectional view which shows a conventional blowby gas ventilation system.
Figure 2:
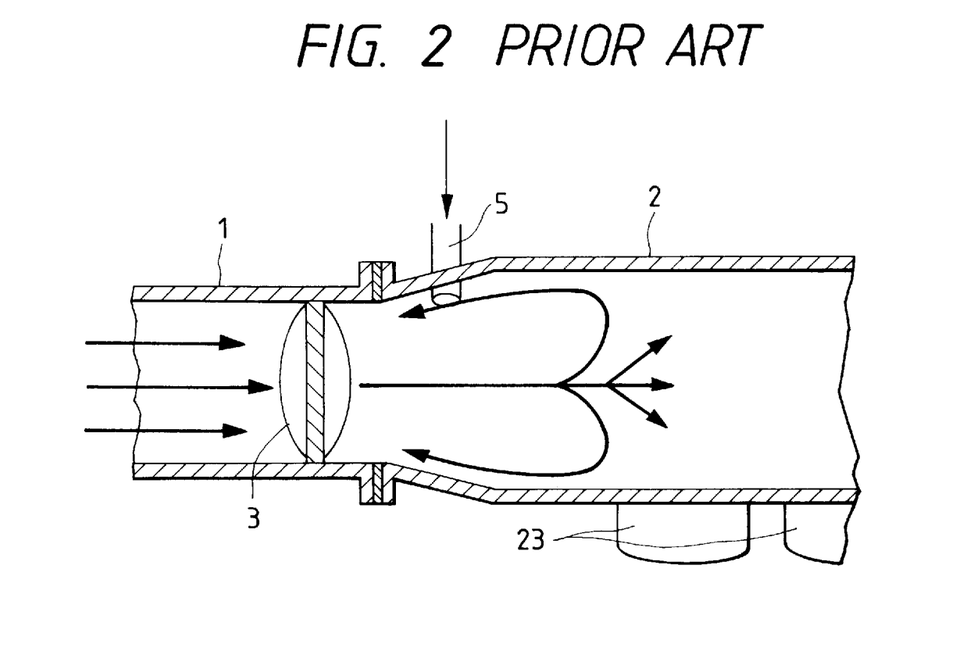
FIG. 2 is a horizontal cross sectional view which shows the conventional blowby gas ventilation system of FIG. 1.

Blowby gas ventilation systems are known in the art wherein blowby gas in a crankcase of an engine is recirculated to an intake pipe for avoiding escape thereof to the atmosphere. FIGS. 1 and 2 shows one example of such blowby gas ventilation systems.

The surge tank 2 is tapered at an upstream side. The throttle body 1 having disposed therein the throttle valve 3 is connected to the surge tank 2. The blowby gas ventilation pipe 5 extends horizontally to the surge tank 2 to open into a tapered wall of the surge tank 2 immediately downstream of the throttle valve 3.

When the open of the throttle valve 3 is small at a lower engine load, intake air, as shown in FIG. 1, flows out of the throttle valve 3 at high speed through small clearances between an inner wall of the throttle body 1 and upper and lower peripheral portions of the throttle valve 3, thereby causing the pressure behind the throttle valve 3 to be decreased to produce strong swirls in that place. These swirls will cause the blowby gas entered from the ventilation pipe 5 to be attracted to the throttle valve 3, thereby causing oil contained in the blowby gas to stick to the throttle valve 3, resulting in oil deposit leading to a failure in a valve operation. Additionally, the backflow to the throttle valve 3 also occurs in horizontal plane as shown in FIG. 2, causing the blowby gas to flow behind the throttle valve 3 so that oil sticks thereto.

Japanese Utility Model First Publication No. 56-161166 teaches a blowby gas ventilation pipe which opens into a cylindrical wall of a venturi disposed within a portion of an intake pipe downstream of a throttle valve for achieving sufficient recirculation of the blowby gas even when the throttle valve is almost closed. This structure however also has the above drawbacks.

Further, in a multi-cylinder engine, the blowby gas entering the surge tank 2 flows into intake pipes 23 connected to a side wall of the surge tank 2 without being mixed with intake air sufficiently, thereby resulting in a variation in the quantity of the blowby gas entering the various cylinders of the engine, thus leading to variations in air-fuel ratio and oil flow to the cylinders.

SUMMARY OF THE INVENTION

It is therefore a principal object of the present invention to avoid the disadvantages of the prior art.

It is another object of the present invention to provide a gas ventilation system designed to keep free from oil contained in a given gas to a throttle valve.

According to one aspect of the present invention, there is provided a gas ventilation system for an internal combustion engine which comprises: (a) a downstream intake pipe communicating with the engine; (b) an upstream intake pipe communicating with the downstream intake pipe through a throttle valve, the upstream intake pipe having an end portion downstream of the throttle valve extending into the downstream intake pipe so as to define a gas passage between an outer peripheral wall of the end portion and an inner wall of the downstream intake pipe; and (c) a gas ventilation pipe opening into the gas passage for supplying a given gas to the downstream intake pipe.

In the preferred mode of the invention, the downstream intake pipe has an upstream end wall connected to the upstream intake pipe. The gas ventilation pipe communicates with the gas passage through an opening formed in a lowermost portion of the end wall of the downstream intake pipe. The downstream intake pipe has a tapered inner bottom wall sloping from the opening in a downstream direction.

An exhaust gas recirculation pipe is further provided which communicates with the gas passage.

The upstream intake pipe is formed with a throttle body. The downstream intake pipe is formed with a surge tank.

According to another aspect of the invention, there is provided a gas ventilation system for an internal combustion engine which comprises: (a) a downstream intake pipe defining therein a downstream intake passage communicating with the engine: (b) an upstream intake pipe defining therein an upstream intake passage communicating with the downstream intake passage in the downstream intake pipe through a throttle valve, the upstream intake pipe being smaller in diameter than the downstream intake pipe; (c) an inner pipe defining therein an intake passage connecting the upstream intake passage and the downstream intake passage, the inner pipe having substantially the same diameter as that of the upstream intake pipe, disposed within the downstream intake pipe to define a gas passage between an outer peripheral wall of the inner pipe and an inner wall of the downstream intake pipe; and (d) a gas ventilation pipe communicating with the gas passage through a connection to the downstream intake pipe for supplying a given gas thereto, the connection being oriented to have a longitudinal center line thereof extend on a plane perpendicular to a longitudinal center line of the inner pipe.

In the preferred mode of the invention, the ventilation pipe is oriented to a tangent of a periphery of the inner pipe.

The downstream intake pipe has a tapered inner bottom wall sloping in a downstream direction from an opening formed in the downstream intake pipe communicating with the gas ventilation pipe.

The gas ventilation pipe is one of a blowby gas ventilation pipe, an exhaust gas recirculation pipe, and a fuel vapor recirculation pipe.

The upstream intake pipe is formed with a throttle body, and wherein the downstream intake pipe is formed with a surge tank.

According to a further aspect of the invention, there is provided a gas ventilation system for an internal combustion engine which comprises: (a) a downstream intake pipe communicating with cylinders of the engine; (b) an upstream intake pipe communicating with the downstream intake pipe through a throttle valve; (c) a gas ventilation pipe communicating with the downstream intake pipe for supplying a given gas thereto; and (d) an isolating means for isolating flow of the gas entering the downstream intake pipe through the gas ventilation pipe from swirls produced by intake air flowing downstream of the throttle valve from the upstream intake pipe.

In the preferred mode of the invention, the gas ventilation pipe is oriented so as to facilitate dispersion of the gas within the gas passage.

The gas ventilation pipe has a longitudinal center line extending on a plane perpendicular to the flow of the intake air.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 3:
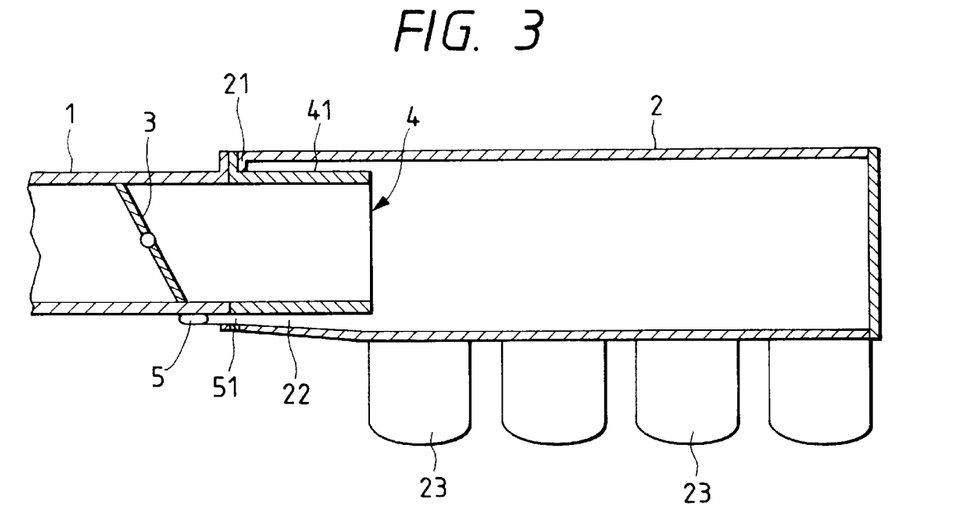
FIG. 3 is a vertical cross sectional view which shows a blowby gas ventilation system with which the first embodiment of the present invention is used.

Referring now to the drawings, particularly to FIG. 3, there is shown the first embodiment of the present invention which is used with a blowby gas ventilation system for an internal combustion engine designed to recirculate to the engine the blowby gas leaking out of engine cylinders to a crankcase.

The cylindrical surge tank 2 defining therein a downstream intake passage is connected at a peripheral wall thereof to cylinders (not shown) of the engine through intake pipes 23. The throttle body 1 defining therein an upstream intake passage is connected to an upstream end wall 21 of the surge tank 2 through the gasket 4 and has a diameter smaller than that of the surge tank 2. The throttle valve 3 is disposed within the throttle body 1 upstream of the gasket 4.

Figure 4:
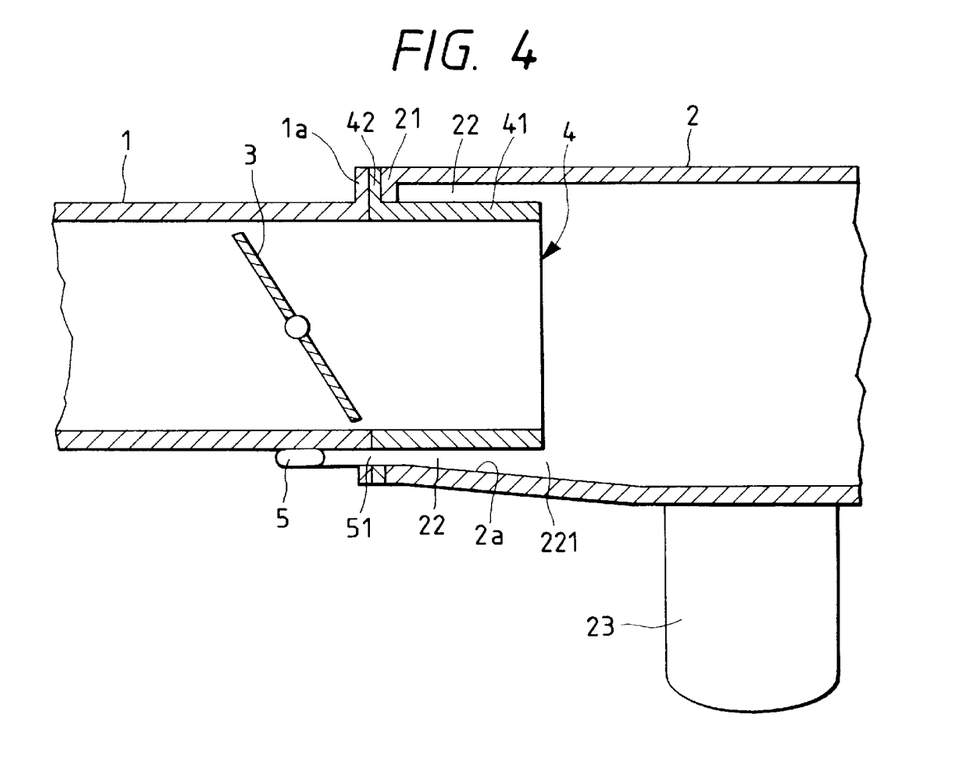
FIG. 4 is an exploded vertical cross sectional view which shows the blowby gas ventilation system of FIG. 3.
Figure 5:
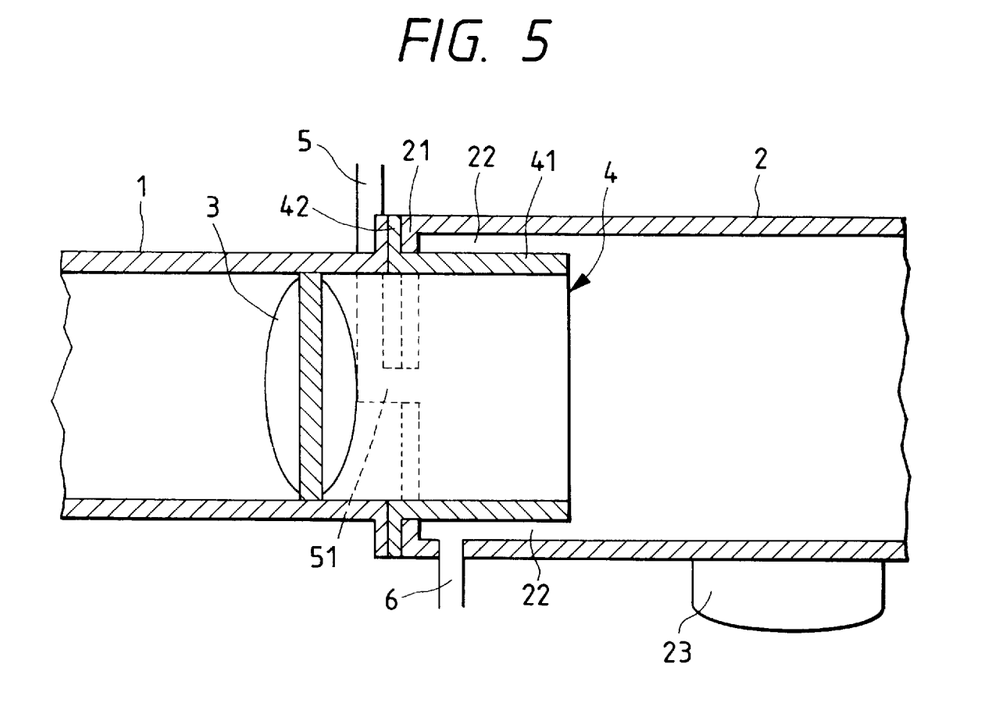
FIG. 5 is an exploded horizontal cross sectional view which shows the blowby gas ventilation system of FIG. 3.

The gasket 4 includes, as shown in FIGS. 4 and 5, the hollow cylindrical member 41 and the flange 42 formed on an end of the cylindrical member 41. The cylindrical member 41 has the same diameter as that of the throttle body 1. The flange 42 is retained between the flange 1a of the throttle body 1 and the end wall 21 of the surge tank 2.

The cylindrical member 41 extends in alignment with the surge tank 2 to define an annular gas passage 22 between the periphery of the cylindrical member 41 and the inner wall 2a of the surge tank 2. The blowby gas ventilation pipe 5 leading to a PCV (positive crankcase ventilation) valve (not shown), as clearly shown in FIG. 5, communicates at an opening 51 with a lowermost portion of the gas passage 22 for supplying the blowby gas to the cylinders of the engine. A bottom portion of the inner wall 2a of the surge tank 2, as shown in FIG. 4, slopes downward to the opening 221 of the gas passage 22.

The exhaust gas recirculation pipe 6 of an EGR system, as shown in FIG. 5 extends horizontally to communicate with the gas passage 22 through the wall of the surge tank 2.

Figure 6:
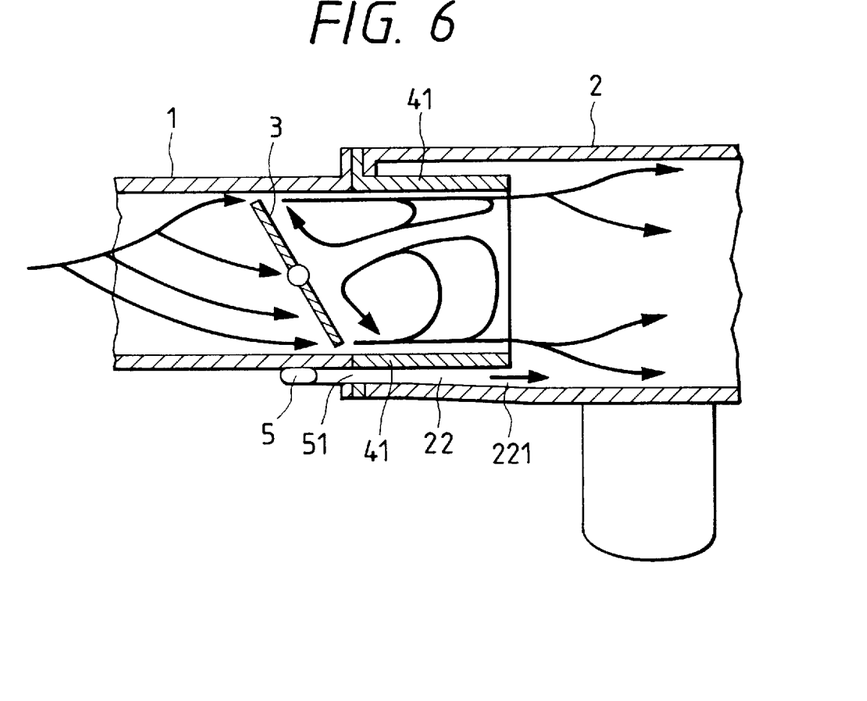
FIG. 6 is a vertical cross sectional view which shows the flow of intake air and blowby gas directed to a surge tank.

In operation, when the open of the throttle valve 3 is relatively small at a low engine load, intake air, as indicated by arrows in FIG. 6, flows into the surge tank 2 at high speed through small clearances formed between an inner wall of the throttle body 1 and upper and lower peripheral portions of the throttle valve 3. The pressure at the rear of the throttle valve 3 is decreased, thereby causing part of the intake air entering the cylindrical member 41 of the gasket 4 to swirl toward the throttle valve 3, while the remainder of the intake air flows in the surge tank 2 at high speed. The gas passage 22 is isolated by the cylindrical member 41 of the gasket 4 from an area downstream of the throttle valve 3 where the swirls of the intake air are produced, so that the blowby gas flows through the gas passage 22 without influence of the swirls of the intake air. Additionally, the part of the intake air, as discussed above, flows into the surge tank 2 at the high speed to exhibit the so-called ejector effect which will cause the blowby gas within the gas passage 22 to be attracted to the high-speed intake air flow so that it enters the surge tank 2 quickly. This prevents the blowby gas from flowing back to the throttle valve 3, keeping free from oil contained in the blowby gas to the throttle valve 3.

Figure 7:
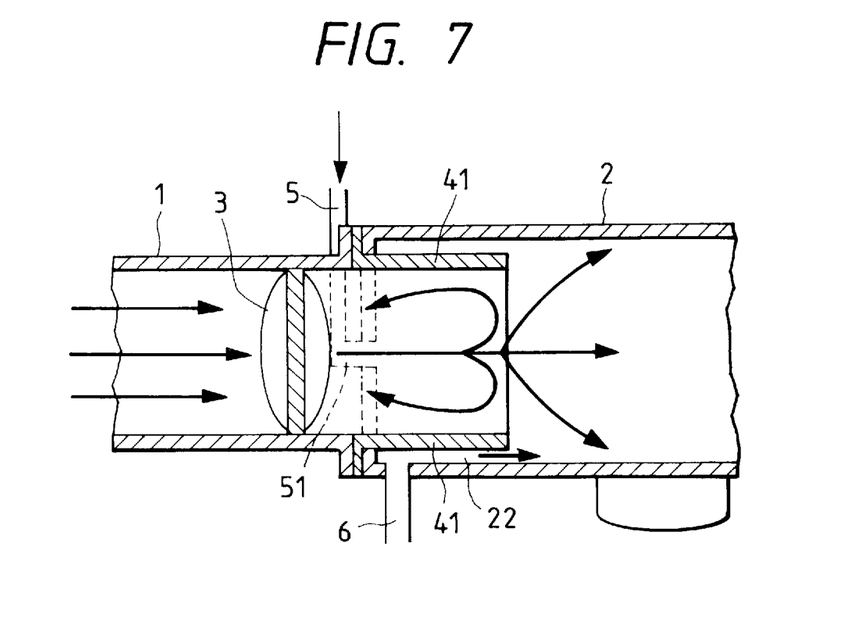
FIG. 7 is a horizontal cross sectional view of FIG. 6.

The same effects as discussed above are offered by a recirculated exhaust gas. Specifically, the exhaust gas flowing into the gas passage 22 from the exhaust gas recirculation pipe 6, as shown in FIG. 7, enters the surge tank 2 quickly with aid of the ejector effect produced by the intake air flowing downstream without being subjected to back flow directed toward the throttle valve 3 along the inner wall of the cylindrical member 41 of the gasket 4.

The oil and water collected in the gas passage 22 are directed inside the surge tank 2 by the inclination of the lowermost portion of the inner wall 2a of the surge tank 2 from the opening 51 of the blowby gas ventilation pipe 5 to the opening 221 of the gas passage 22, thereby avoiding icing (see FIG. 4).

The exhaust gas recirculation pipe 6 may be disposed adjacent the blowby gas ventilation pipe 5 at the lowermost portion of the surge tank 2 for facilitating the recirculation of the exhaust gas.

Figure 8A:
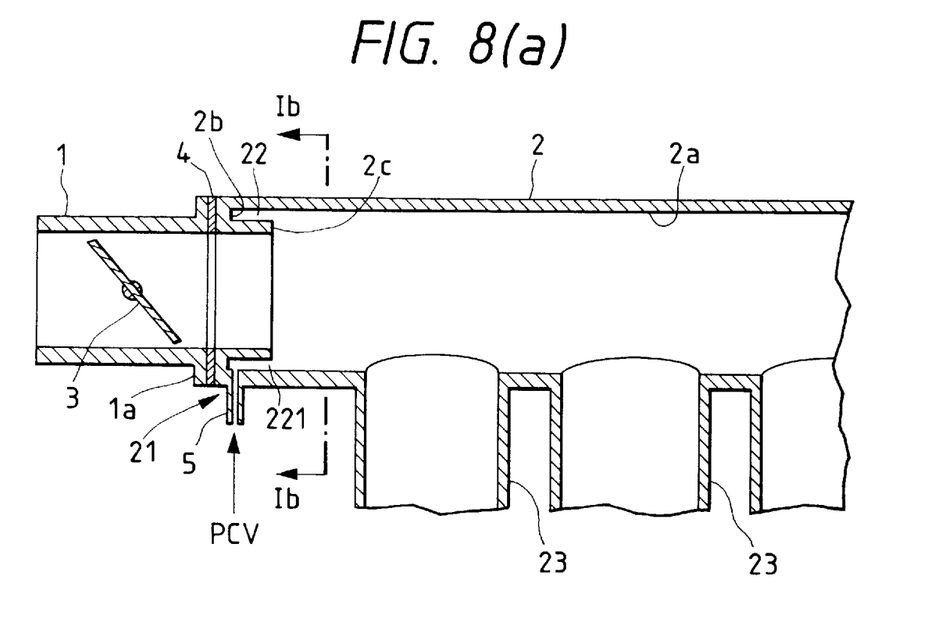
FIG. 8(a) is a vertical cross sectional view which shows the second embodiment of a blowby gas ventilation system of the invention.
Figure 8B:
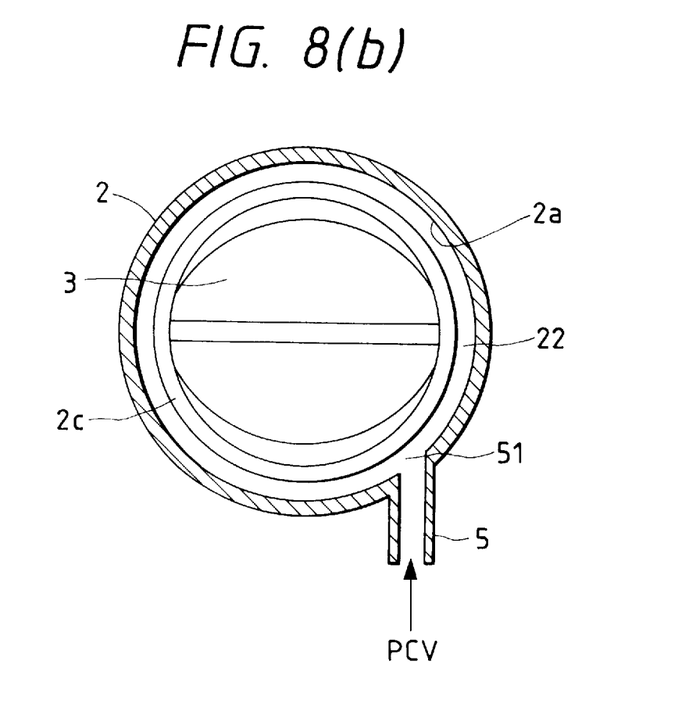
FIG. 8(b) is a cross sectional view taken along the line Ib in FIG. 8(a)

FIGS. 8(a) and 8(b) show the second embodiment of the blowby gas ventilation system of the invention. The same reference numbers as employed in the above first embodiment refer to the same parts, and explanation thereof in detail will be omitted here.

The throttle body 1 has disposed on a downstream end the flange 1a over a given circumference. The flange 1a is connected to the annular end wall 2b of the surge tank 2 through the gasket 4. The surge tank 4 includes the inner cylinder 2c which has substantially the same diameter as that of the throttle body 1 and extends coaxially with the throttle body 1 from the annular end wall 2b in a downstream direction so as to define the annular gas passage 22, as shown in FIG. 8(b), between the inner cylinder 2c and the inner wall 2a of the surge tank 4.

The blowby gas ventilation pipe 5 is connected at one end to the PCV valve (not shown) and, as clearly shown in FIG. 8(b), at the other end to the gas passage 22 through the opening 51 formed in a lower peripheral wall of the surge tank 2 near the end wall 2b. The blowby gas ventilation pipe 5 is oriented to have the longitudinal center line extend along a plane perpendicular to the longitudinal center line of the inner cylinder 2c, thereby causing the blowby gas to be dispersed within the gas passage 22, mixed with the intake air, and distributed to the intake pipes 23 uniformly. It is advisable that the blowby gas ventilation pipes 5, as shown in FIG. 8(b), be oriented to a tangent of the periphery of the inner cylinder 2c for facilitating the dispersion of the blowby gas within the gas passage 22.

Figure 10A:
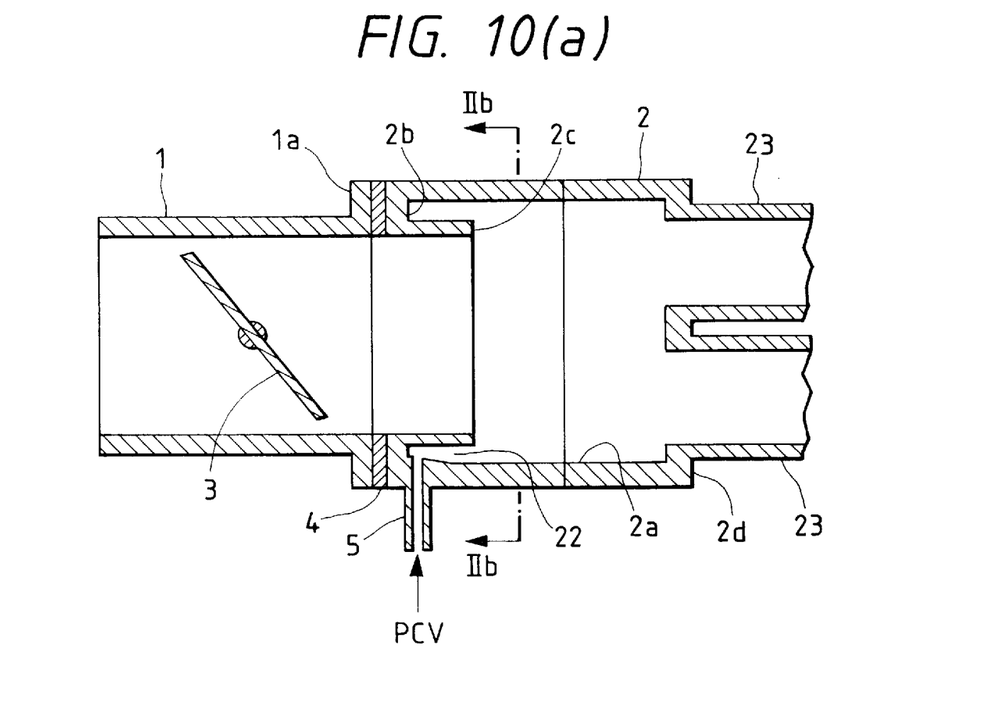
FIG. 10(a) is a vertical cross sectional view which shows a modified form of a surge tank in the second embodiment.

A lower portion of the inner wall 2a of the surge tank 2 around the opening 51, as shown in FIG. 10(a), defines a tapered surface sloping to the opening 221 of the gas passage 22 for facilitating easy discharge of oil and water collected within the gas passage 22 to the surge tank 2.

Figure 9A:
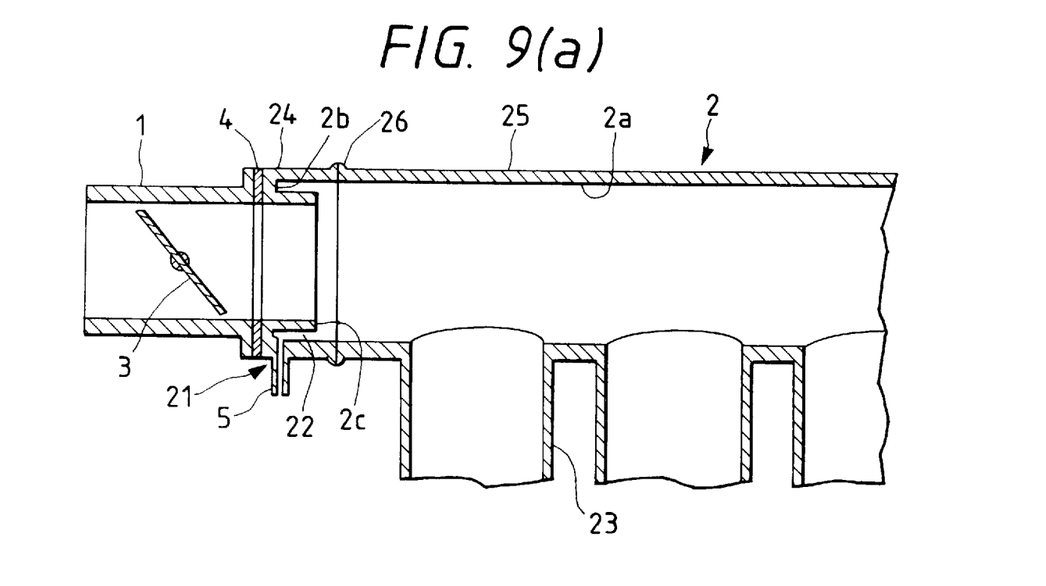
FIG. 9(a) is a vertical cross sectional view which shows a connection between an inner cylinder and a surge tank.
Figure 9B:
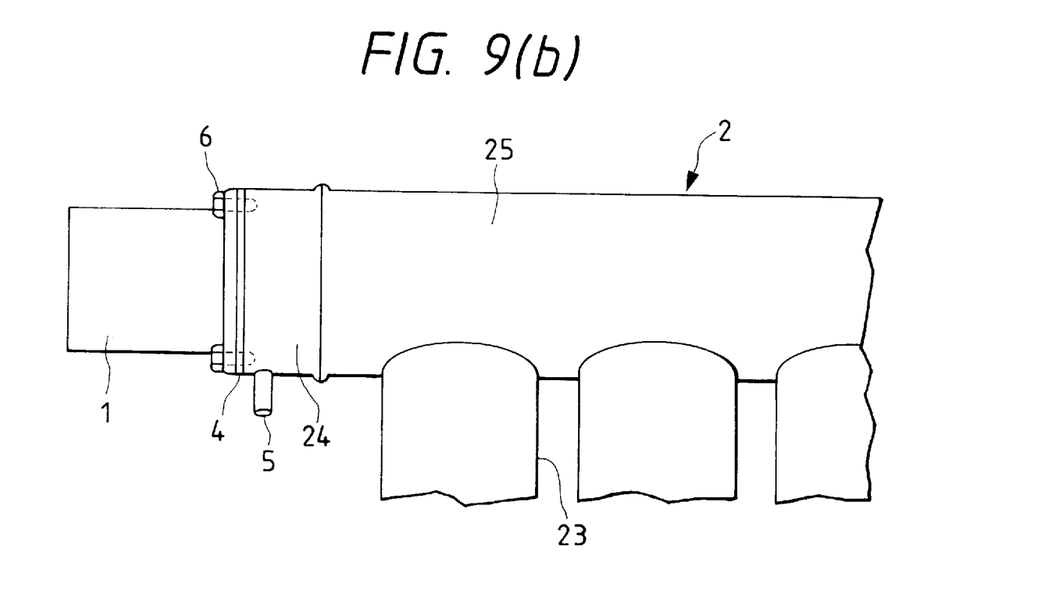
FIG. 9(b) is a front view of FIG. 9(a)

The surge tank 2, as shown in FIGS. 9(a) and 9(b), includes generally the upstream cylinder 24 and the downstream cylinder 25. The upstream cylinder 24 includes the annular end wall 2b and the inner cylinder 2c in one piece structure. The downstream cylinder 25 is connected to the intake pipes 23 at a peripheral wall thereof. The upstream and downstream cylinders 24 and 25 are welded together as indicated by numeral 26. The blowby gas ventilation pipe 5 is pressed into the upstream cylinder 24. The throttle body 1 and the surge tank 2 are connected through the gasket 4 using screws 6 as shown in FIG. 9(b).

In operation, when the open of the throttle valve 3 is relatively small at a low engine load, intake air, as discussed above, flows into the surge tank 2 at high speed through small clearances formed between the inner wall of the throttle body 1 and upper and lower peripheral portions of the throttle valve 3. The pressure at the rear of the throttle valve 3 is decreased, thereby causing part of the intake air passing through the throttle valve 3 to swirl, while the remainder of the intake air flows in the surge tank 2 at high speed.

The gas passage 22 is isolated by the inner cylinder 2c from the swirls of the intake air, so that the blowby gas flows through the gas passage 22 without being subjected to the swirls of the intake air. Additionally, the part of the intake air, as discussed above, flows into the surge tank 2 at the high speed, thereby causing the blowby gas within the gas passage 22 to be drawn to the high-speed flow of the intake air so that it enters the surge tank 2 quickly. This prevents the blowby gas from flowing back to the throttle valve 3, keeping free from oil contained in the blowby gas to the throttle valve 3.

The blowby gas ventilation pipe 5 is oriented to the tangent of the inner cylinder 2c, thereby causing the blowby gas entering the gas passage 22 from the opening 51 to be directed to the opening 221 while being turned or stirred around the inner cylinder 2c. The blowby gas then emerges out of the whole of the opening 221 uniformly so that it is mixed with the intake air flowing from the throttle body 1 and then disperses within the surge tank 2, thereby achieving uniform distribution of the blowby gas to the intake pipes 23.

Figure 10B:
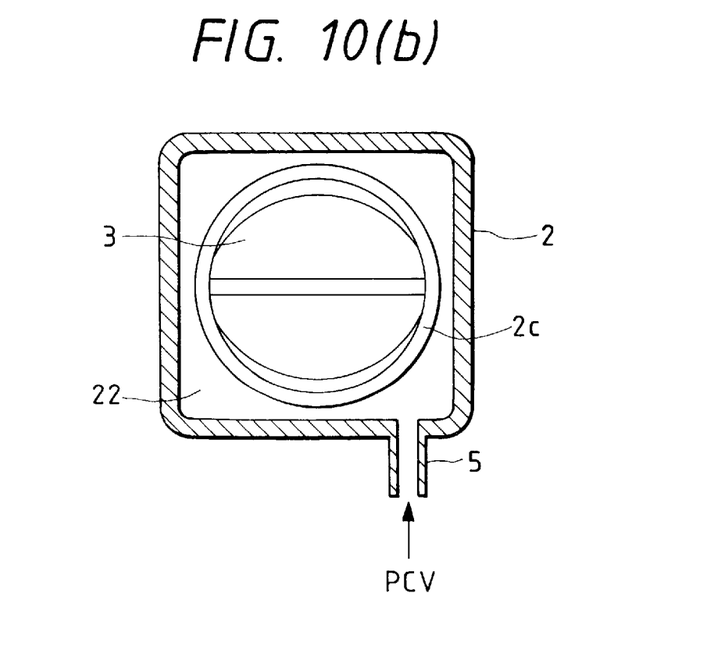
FIG. 10(b) is a cross sectional view taken along the line IIb in FIG. 10(a)

FIGS. 10(a) and 10(b) show a modified form of the surge tank 2.

The surge tank 2 is, as clearly shown in FIG. 10(b), made of a square pipe having the length shorter than that shown in FIGS. 8(a) and 8(b). Two pairs of the intake pipes 23 are connected to a downstream end wall 2d of the surge tank 2 in alignment therewith so that one of the pairs is arranged away from the other horizontally (only one pair is shown for the brevity of illustration). The surge tank 2 has disposed at an upstream end wall 2b the inner cylinder 2c having the same structure as that in FIGS. 8(a) and 8(b) to define the gas passage 22. The blowby gas ventilation pipe 5 communicates with the gas passage 22 through a portion of the bottom near a corner of the surge tank 2. Specifically, the blowby gas ventilation pipe 5 is oriented substantially to the tangent of the inner cylinder 2c.

In this structure, the distance between the throttle valve 3 and the intake pipes 23 is short, and it is difficult to distribute the blowby gas to the intake pipes 23 uniformly. The orientation of the blowby gas ventilation pipe 5 to the tangent of the inner cylinder 2c however facilitates mixing of the blowby gas with the intake air within the short distance.

Figure 11A:
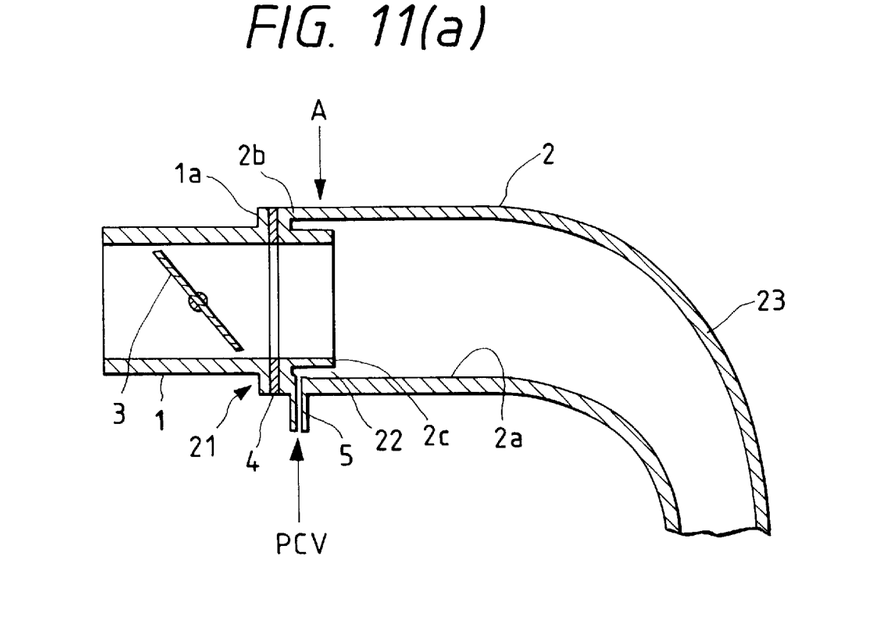
FIG. 11(a) is a vertical cross sectional view which shows a second modified form of a surge tank in the second embodiment.
Figure 11B:
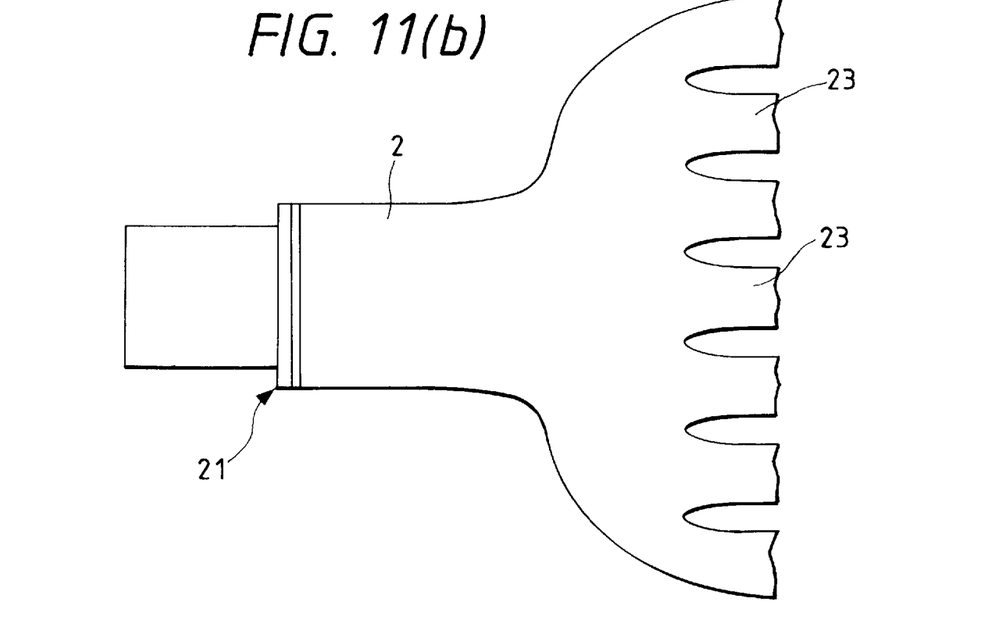
FIG. 11(b) is a perspective illustration as viewed from an arrow A in FIG. 11 (a)

FIGS. 11(a) and 11(b) show a second modified form of the surge tank 2.

The surge tank 2 is made of a cylindrical member. The intake pipes 23 are arranged adjacent to each other and curved downward as viewed in FIG. 11(a). This allows the distance between the upstream end wall 2b of the surge tank 2 and the intake pipes 23 to be shortened, resulting in a compact structure of the system. Other arrangements are the same as those of the second embodiment shown in FIGS. 8(a) and 8(b).

Figure 12A:
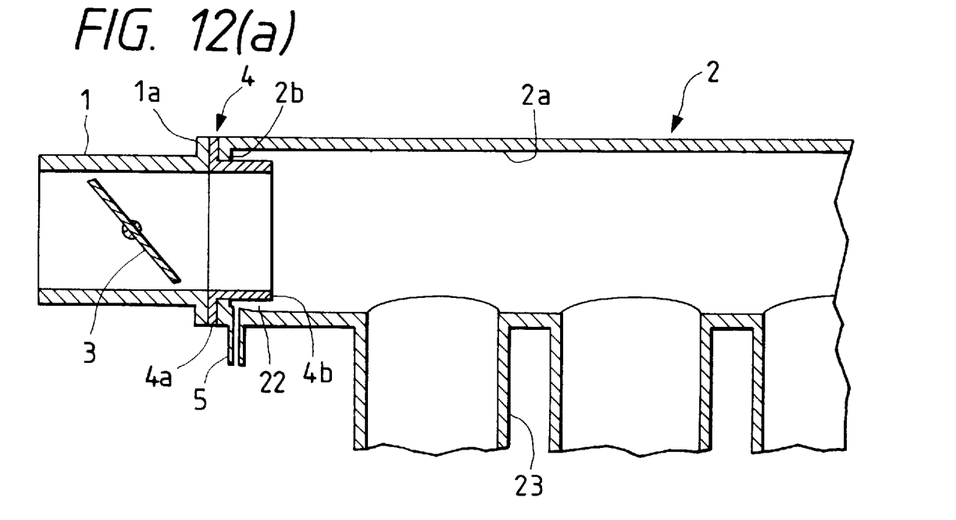
FIG. 12(a) is a vertical cross sectional view which shows a third modified form of a surge tank.
Figure 12B:
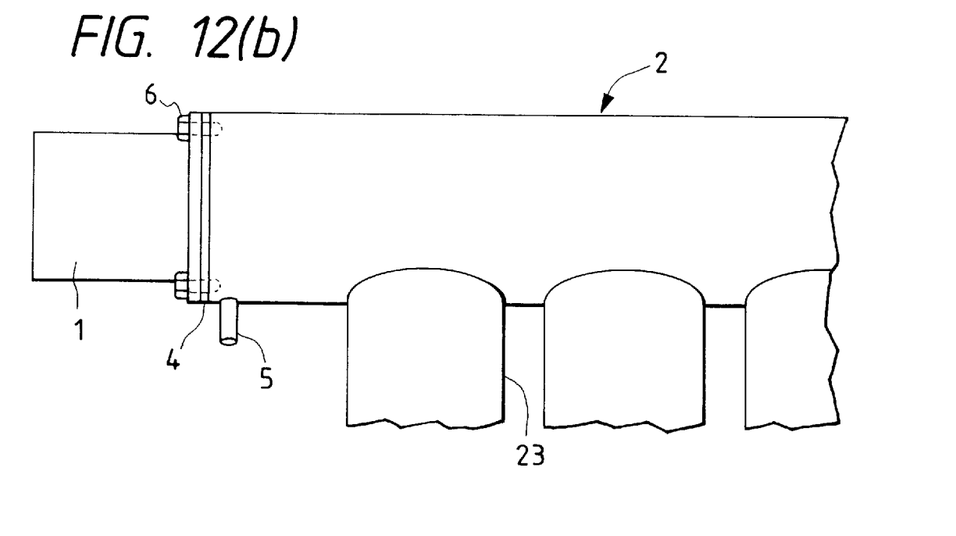
FIG. 12(b) is a front view of FIG. 12(a)
Figure 12C:
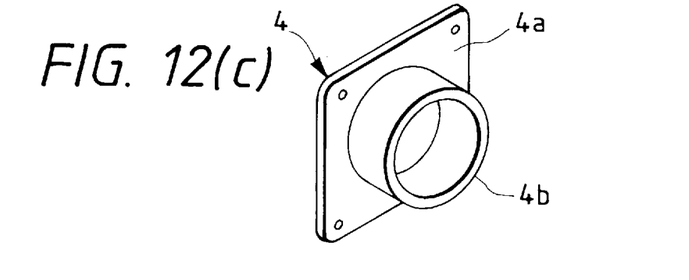
FIG. 12(c) is a perspective view which shows a gasket connected to the surge tank in FIG. 12(a).

FIGS. 12(a) to 12(c) show a third modified form of the surge tank 2 which is different from the second embodiment shown in FIGS. 8(a) and 8(b) in that the gasket 4 has an inner cylinder of the surge tank 2.

Specifically, the gasket 4 is made of a one-piece member including, as apparent from FIG. 12(c), the square plate 4a and the hollow cylinder 4b. The square plate 4a is retained between the upstream end wall 2b of the surge tank 2 and the flange 1a of the throttle body 1 using the screws 6 so that the cylinder 4b is inserted into the surge tank 2 to define the gas passage 22, similar to the above embodiments. The blowby gas ventilation pipes 5 is oriented to the tangent of the cylinder 4b. Other arrangements are the same as those of the above second embodiment, and explanation thereof in detail will be omitted here.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

For example, the present invention may be used with exhaust emission control systems such as an exhaust gas recirculation system and a canister-purged gas recirculation system. Specifically, an exhaust gas recirculation pipe(s) or a fuel vapor recirculation pipe(s) may be connected to the gas passage 22 in place of the blowby gas ventilation pipe 5.

What is claimed is:

1. A gas ventilation system for an internal combustion engine comprising:
    a downstream intake pipe communicating with the engine;
    an upstream intake pipe communicating with said downstream intake pipe through a throttle valve, said upstream intake pipe having an end portion downstream of the throttle valve extending into said downstream intake pipe so as to define a gas passage between an outer peripheral wall of the end portion and an inner wall of said downstream intake pipe; and
    a gas ventilation pipe opening into the gas passage for supplying a given gas to said downstream intake pipe wherein said gas ventilation pipe is oriented tangentially to the periphery of said end portion of said upstream intake pipe.

2. A gas ventilation system as set forth in claim 1, wherein said downstream intake pipe has an upstream end wall connected to said upstream intake pipe, said gas ventilation pipe communicating with the gas passage through an opening formed in a lowermost portion of the end wall of said downstream intake pipe, and wherein said downstream intake pipe has a tapered inner bottom wall sloping from the opening in a downstream direction.

3. A gas ventilation system as set forth in claim 1, further comprising an exhaust gas recirculation pipe communicating with said gas passage.

4. A gas ventilation system as set forth in claim 1, wherein said upstream intake pipe is formed with a throttle body, and wherein the downstream intake pipe is formed with a surge tank.

5. A gas ventilation system as set forth in claim 1, wherein said downstream intake pipe has an upstream end wall connected to said upstream intake pipe, said gas ventilation pipe communicating with the gas passage through an opening formed in a lowermost portion of the end wall of said downstream intake pipe, and wherein said downstream intake pipe has a tapered inner bottom wall sloping from the opening in a downstream direction.

6. A gas ventilation system as set forth in claim 1, further comprising an exhaust gas recirculation pipe communicating with said gas passage.

7. A gas ventilation system as set forth in claim 1, wherein said upstream intake pipe is formed with a throttle body, and wherein the downstream intake pipe is formed with a surge tank.

8. A gas ventilation system as in claim 1, wherein
    said upstream intake pipe is connected to a joint end of said downstream intake pipe and
    said gas ventilation pipe opens into the gas passage at an interval away from the joint end of said downstream intake pipe.

9. A gas ventilation system for an internal combustion engine comprising:
    a downstream intake pipe defining therein a downstream intake passage communicating with the engine;
    an upstream intake pipe defining therein an upstream intake passage communicating with the downstream intake passage in said downstream intake pipe through a throttle valve, the upstream intake pipe being smaller in diameter than the downstream intake pipe;
    an inner pipe defining therein an intake passage connecting the upstream intake passage and the downstream intake passage, said inner pipe having substantially the same diameter as that of said upstream intake pipe, disposed within said downstream intake pipe to define a gas passage between an outer peripheral wall of said inner pipe and an inner wall of said downstream intake pipe; and
    a gas ventilation pipe communicating with the gas passage through a connection to said downstream intake pipe for supplying a given gas thereto, the connection being oriented to have a longitudinal center line thereof extend on a plane perpendicular to a longitudinal center line of said inner pipe wherein said gas ventilation pipe is oriented tangentially to the periphery of said inner pipe.

10. A gas ventilation system as set forth in claim 9, wherein said downstream intake pipe has a tapered inner bottom wall sloping in a downstream direction from an opening formed in said downstream intake pipe communicating with said gas ventilation pipe.

11. A gas ventilation system as set forth in claim 9, wherein said gas ventilation pipe is one of a blowby gas ventilation pipe, an exhaust gas recirculation pipe, and a fuel vapor recirculation pipe.

12. A gas ventilation system as set forth in claim 9, wherein said upstream intake pipe is formed with a throttle body, and wherein the downstream intake pipe is formed with a surge tank.

13. A gas ventilation system as set forth in claim 9, wherein said gas ventilation pipe is oriented tangentially to the periphery of said inner pipe.

14. A gas ventilation system as set forth in claim 9, wherein said downstream intake pipe has a tapered inner bottom wall sloping in a downstream direction from an opening formed in said downstream intake pipe communicating with said gas ventilation pipe.

15. A gas ventilation system as set forth in claim 9, wherein said gas ventilation pipe is one of a blowby gas ventilation pipe, an exhaust gas recirculation pipe, and a fuel vapor recirculation pipe.

16. A gas ventilation system as set forth in claim 9, wherein said stream intake pipe is formed with a throttle body, and wherein the downstream intake pipe is formed with a surge tank.

17. A gas ventilation system for an internal combustion engine comprising:
    a downstream intake pipe communicating with cylinders of the engine;
    an upstream intake pipe communicating with said downstream intake pipe through a throttle valve;
    a gas ventilation pipe communicating with said downstream intake pipe for supplying a given gas thereto; and
    isolating means for isolating flow of the gas entering said downstream intake pipe through said gas ventilation pipe from swirls produced by intake air flowing downstream of the throttle valve from said upstream intake pipe wherein said gas ventilation pipe is oriented tangentially to the periphery of said isolating means.

18. A gas ventilation system as set forth in claim 17, wherein said gas ventilation pipe is oriented so as to facilitate dispersion of the gas within said downstream intake pipe.

19. A gas ventilation system as set forth in claim 18, wherein said gas ventilation pipe has a longitudinal center line extending on a plane perpendicular to the flow of the intake air.

20. A gas ventilation system for an internal combustion engine comprising:

a downstream intake pipe communicating with the engine;

an upstream intake pipe communicating with said downstream intake pipe through a throttle valve, said upstream intake pipe having an end portion downstream of the throttle valve extending into said downstream intake pipe so as to define a gas passage between an outer peripheral wall of the end portion and an inner wall of said downstream intake pipe; and a gas ventilation pipe opening into the gas passage for supplying a given gas to said downstream intake pipe, said gas ventilation pipe having a longitudinal center line which extends in a direction perpendicular but laterally offset from to a longitudinal center line of said upstream intake pipe.

21. A gas ventilation system system for an internal combustion engine comprising:

a downstream intake pipe communicating with the engine;

an upstream intake pipe communicating with said downstream intake pipe through a throttle valve, said upstream intake pipe having an end portion downstream of the throttle valve extending into said downstream intake pipe so as to define a gas passage between an outer peripheral wall of the end portion and an inner wall of said downstream intake pipe; and a gas ventilation pipe opening into the gas passage for supplying a given gas to said downstream intake pipe, wherein a length of the end portion of said upstream intake pipe is greater than a distance between a downstream-most point of a movable range of the throttle valve and an upstream end of said downstream intake pipe, and wherein the length of the end portion of said upstream intake pipe is so determined as to isolate the flow of the gas from said gas ventilation pipe into the gas passage from swirls produced by intake air flowing downstream of the throttle valve from said upstream intake pipe.

22. A gas ventilation system for an internal combustion engine comprising:

a downstream intake pipe defining therein a downstream intake passage communicating with the engine;

an upstream intake pipe defining therein an upstream intake passage communicating with the downstream intake passage in said downstream intake pipe through a throttle valve, the upstream intake pipe being smaller in diameter than the downstream intake pipe;

an inner pipe defining therein an intake passage connecting the upstream intake passage and the downstream intake passage, said inner pipe having substantially the same diameter as that of said upstream intake pipe, disposed within said downstream intake pipe to define a gas passage between an outer peripheral wall of said inner pipe and an inner wall of said downstream intake pipe; and a gas ventilation pipe communicating with the gas passage through a connection to said downstream intake pipe for supplying a given gas thereto, the connection being oriented to have a longitudinal center line thereof extend on a plane perpendicular to a longitudinal center line of said inner pipe, wherein a length of said inner pipe is greater than a distance between a downstream-most point of a movable range of the throttle valve and an upstream end of said downstream intake pipe, and wherein the length of said inner pipe is so determined as to isolate the flow of the gas from said gas ventilation pipe into the gas passage from swirls produced by intake air flowing downstream of the throttle valve from said upstream intake pipe.

23. A gas ventilation system for an internal combustion engine comprising:

a downstream intake pipe communicating with cylinders of the engine;

an upstream intake pipe communicating with said downstream intake pipe through a throttle valve;

a gas ventilation pipe communicating with said downstream intake pipe for supplying a given gas thereto; and isolating means for isolating flow of the gas entering said downstream intake pipe through said gas ventilation pipe from swirls produced by intake air flowing downstream of the throttle valve from said upstream intake pipe, said isolating means including an end portion of said upstream intake pipe extending into an upstream portion of said downstream intake pipe, wherein a length of said inner pipe is greater than a distance between a downstream-most point of a movable range of the throttle valve and an upstream end of said downstream intake pipe, and wherein said gas ventilation pipe is oriented so as to facilitate dispersion of the gas within said downstream intake pipe.

24. A gas ventilation system as forth in claim 23, wherein said gas ventilation pipe has a longitudinal center line extending on a plane perpendicular to the flow of the intake air.

* * * * *